Oct. 9, 1934.     J. M. ARTHUYS ET AL     1,976,428
SELF REGULATING HELIOSTAT
Filed June 13, 1934      5 Sheets-Sheet 1
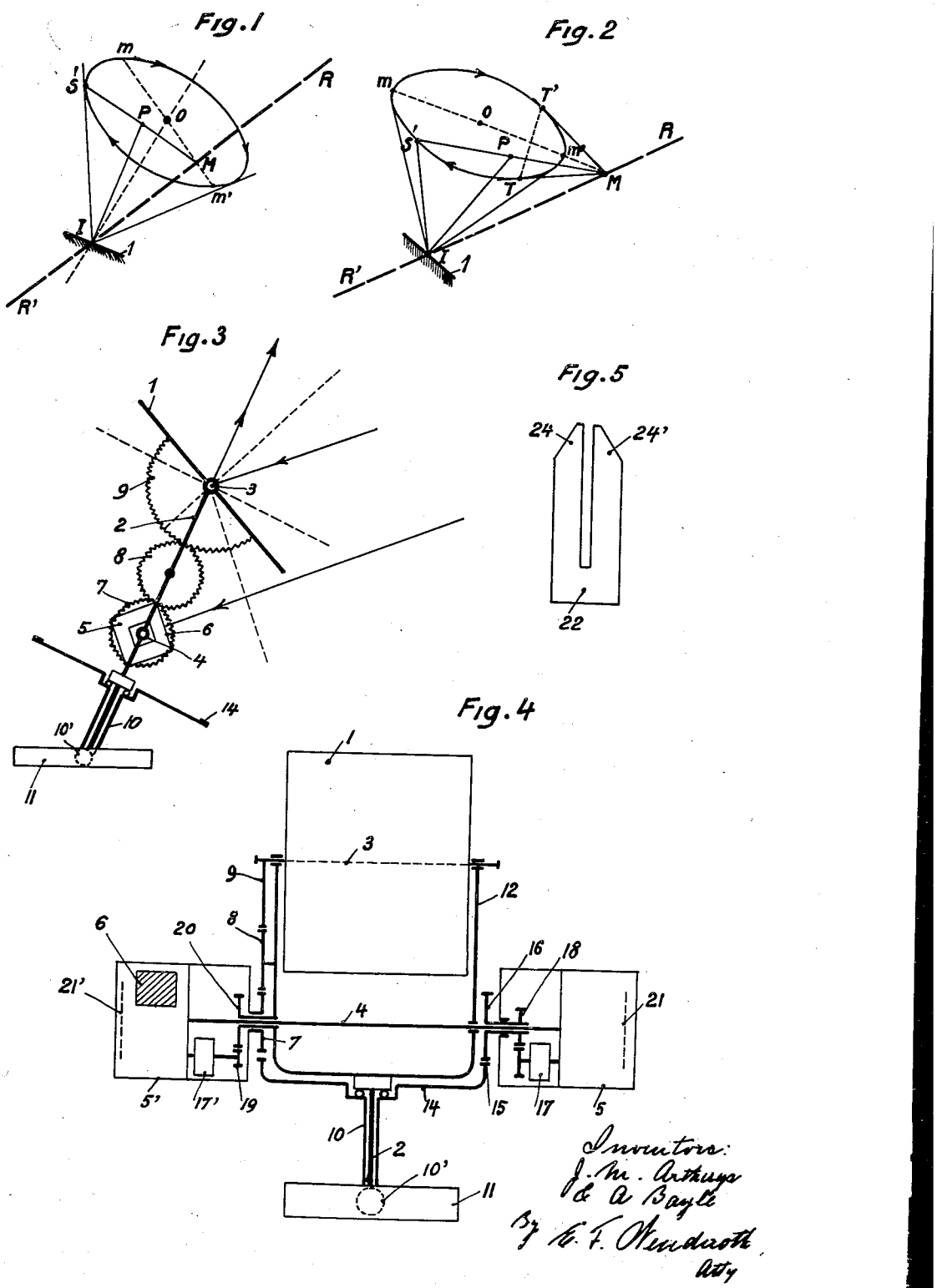

Oct. 9, 1934.  J. M. ARTHUYS ET AL  1,976,428
SELF REGULATING HELIOSTAT
Filed June 13, 1934  5 Sheets-Sheet 2

Inventors:
J. M. Arthuys
& A. Bayle
By E. F. Wenderoth
Atty

Oct. 9, 1934.   J. M. ARTHUYS ET AL   1,976,428
SELF REGULATING HELIOSTAT
Filed June 13, 1934    5 Sheets-Sheet 3

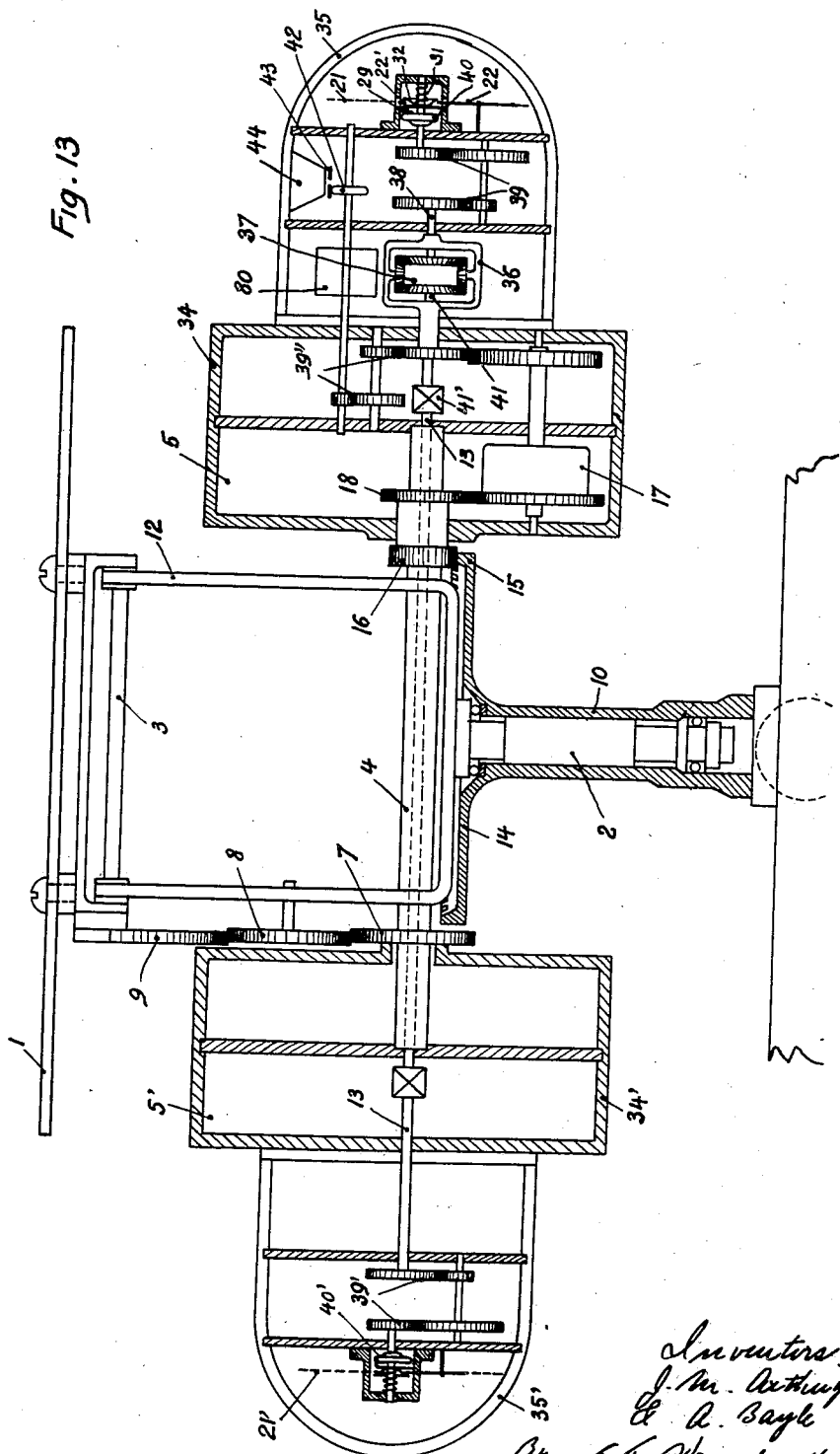

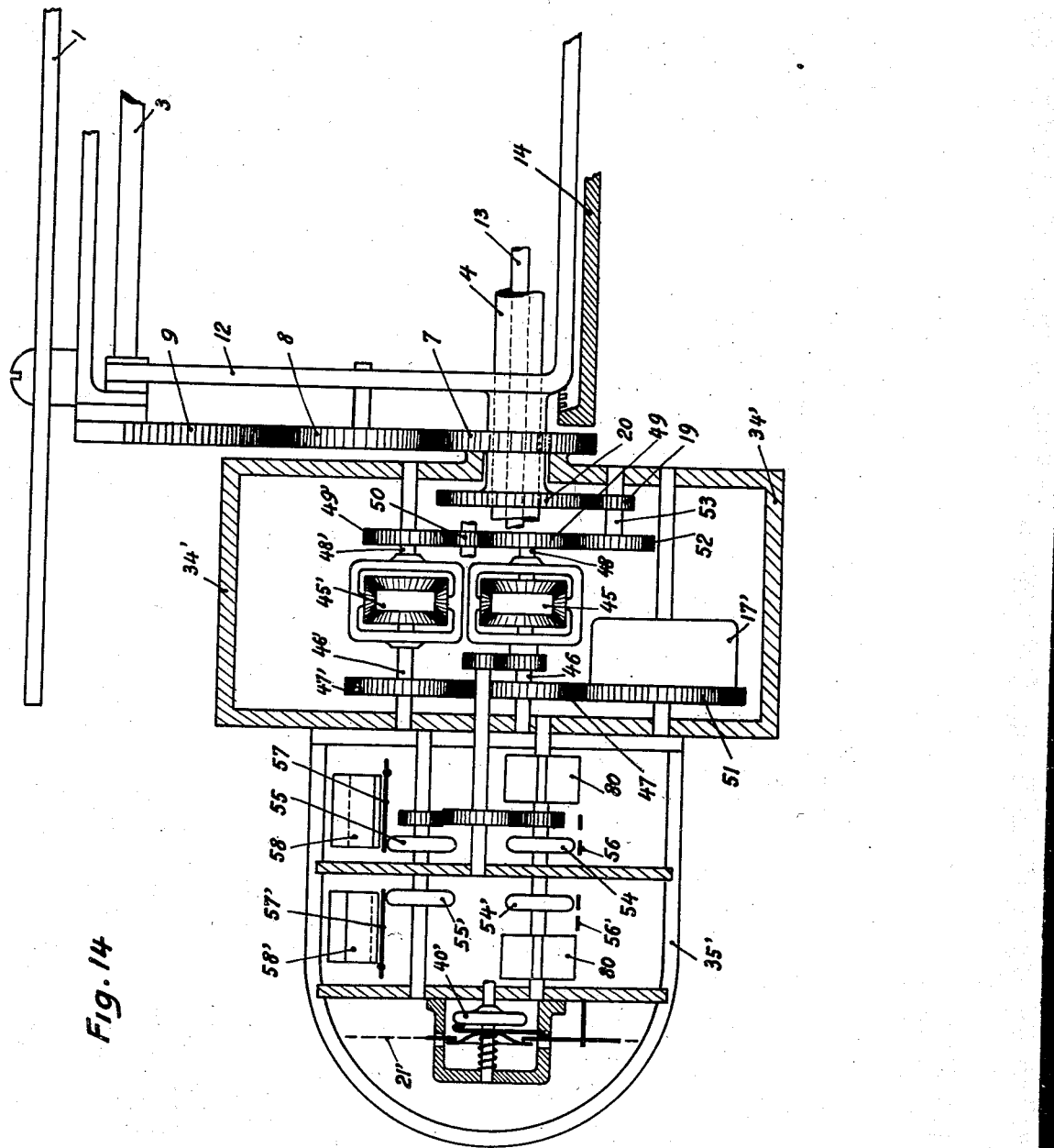

Patented Oct. 9, 1934

1,976,428

UNITED STATES PATENT OFFICE 1,976,428

SELF REGULATING HELIOSTAT

Jacques Marie Arthuys and André Bayle, Paris, France, assignors to Society said Arthel (Société d'Exploitation des brevets Jacques Arthuys), Paris, France, a corporation of France Application June 13, 1934, Serial No. 730,524
In France November 23, 1933

20 Claims. (Cl. 88—25)

The present invention concerns a self regulating heliostat of the type in which a mirror movable about two perpendicular axes is controlled by the displacements of the sun with the aid of one or more motors controlled by relays actuated by the solar rays in such a manner that the rays reflected by the mirror are maintained in a fixed direction; these apparatus are, moreover, provided with means for re-setting automatically the mirror as soon as the sun re-appears, after having disappeared for a more or less long time.

The diagrammatic Figures 1 and 2 enable the general principle of the apparatus object of the invention to be understood.

Let O be the center of the circle described by the sun S' during its apparent daily movement, and I the point occupied by the mirror 1 adapted to reflect the solar rays in the fixed direction R'IR, this direction intersecting in M the plane of the circle O. As the sun moves, the incident beam S'I describes a cone whose apex is I and whose apex angle varies according to the seasons, whilst the plane of incidence S'IM rotates around the line R'IR. In order that the beam S'I shall always be reflected along IR, it is clear that the following two conditions must be fulfilled:

(1) The mirror 1 must be integral with the plane S'IM and be constantly perpendicular to this plane. It is therefore necessary that the mirror shall turn about the axis R'IR which will be termed "the primary axis".

(2) The bisector IP of the angle S'IM must be constantly perpendicular to the mirror. The latter must therefore be capable of rotating about an axis passing through the point I and perpendicular to the plane S'IM, therefore perpendicular to the primary axis R'IR. This second axis will be termed "the secondary axis".

It is further obvious that the angle of rotation of the mirror about the secondary axis must be equal to the half of the variation of the angle S'IM.

It has been assumed in the above that the direction IR of the reflected beams lies inside the cone described by the incident beam S'I. In this case it will be seen that, in order to follow the sun, the mirror must constantly turn in the same direction about the primary axis R'IR. On the contrary, as the angle S'IM increases, when the sun moves in the direction of the arrow on the semicircle m'm and decreases along the semicircle mm', the direction of the secondary rotation of the mirror must be capable of being reversed.

If it is now assumed (Fig. 2) that the direction R'IR of the reflected rays lies outside of the cone described by the incident beam S'I, it will be easily seen that the direction of the secondary rotation of the mirror must again be capable of being reversed when the sun passes through the points m and m' corresponding respectively to the maximum and to the minimum value of the angle S'IM, but that, furthermore, the direction of the primary rotation must also be capable of being reversed when the sun passes through the points T and T', the lines MT and MT' being the tangents to the circle O drawn through M. In fact, as the sun describes the arc TmT', the plane S'IM rotates in the direction TT', whilst it will obviously turn in the reverse direction, i. e. T'T as the sun describes the arc T'mT.

Moreover, it will be easily understood, that in both cases (Figs. 1 and 2), the primary rotation will have to take place in one or the other direction according to whether the mirror will have to illuminate towards the southern or the northern hemisphere of the celestial sphere, i. e. according to whether the point I is situated on one or the other side of the plane of the circle O.

Apparatus based on this general principle are already known, in which the primary axis R'IR is parallel to the axis of the world; in this case, the angle S'IM remains practically constant in the course of a daily revolution of the sun on the circle O, so that the secondary movement is intended only for following the seasonly variations of this angle, i. e. the declination movement of the sun. In these known apparatus, the relays sensitive to the solar light controlling the motors driving the mirror are fixed and disposed on the path of the rays reflected by the latter, so that in order to be able to send the received rays into various directions, it is necessary to provide a second adjustable mirror which receives the rays reflected by the first.

The apparatus of this type are cumbersome and comprise certain constructional complications, their application thus being limited only to very powerful apparatus, for instance to those installed in a permanent manner on the roof of a house for illuminating, by means of the reflected rays, dark premises opening on interior yards where the sun does not penetrate, or situated below the ground floor.

The object of the present invention is to provide an apparatus comprising a single mirror, particularly in the case of low powers of illumination, easily transportable, comprising no astronomic axis adjustment and enabling to vary easily the direction of the reflected rays; this apparatus is characterized by the fact that it comprises a primary shaft which may be set in direction and a member termed "the orientation face" constituted by relays acted upon by the incident solar rays, controlling the primary and secondary rotations and disposed in a manner to maintain automatically the said orientation face perpendicular to the solar rays, this orientation face being connected to the mirror in a manner to be integral with the latter in rotation about the primary axis and in a manner to make it rotate about the secondary axis by an angle half of its own angle of rotation, the latter connection being established in a manner that the orientation face and the mirror are parallel when the mirror is perpendicular to the primary axis.

By way of example, one form of realization of the apparatus object of the invention has been described below and represented on the annexed drawings.

Figs. 1 and 2 are diagrams, as explained above, for understanding the principle of the apparatus.

Figs. 3 and 4 represent in a purely diagrammatic manner, the apparatus seen in lateral elevation and in front view.

Figs. 5 to 12 represent diagrammatically the arrangement of the relays and of the parts controlled by the latter, Fig. 10 being a section along the line XX of Fig. 11.

Fig. 13 represents the whole of the mechanism controlling the primary movement.

Fig. 14 represents the parts controlling the secondary movement.

Figure 15:
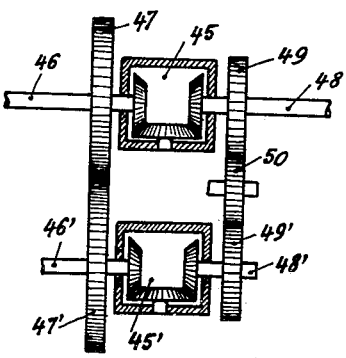

Fig. 15 concerns a device for reversing the direction of the secondary movement.

Figure 16:
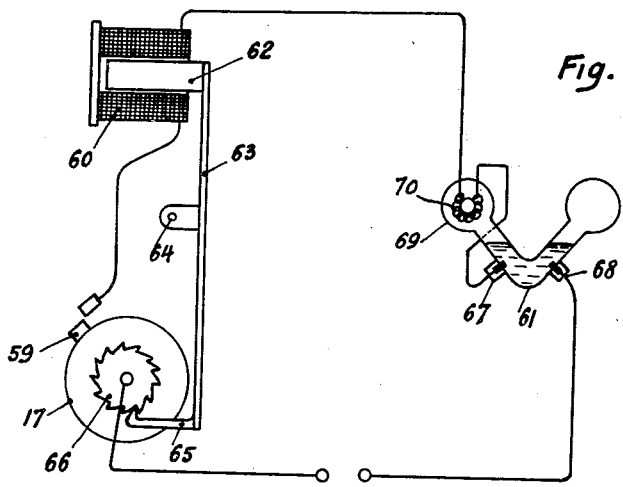
Figure 17:
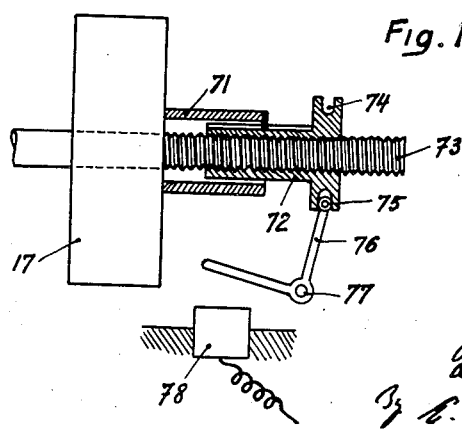

Figs. 16 and 17 concern an electrical device for automatically rewinding the spring motors driving the apparatus.

According to Fig. 3, the mirror 1 is driven in two distinct rotations, on one hand, by a shaft 2 termed the primary shaft and, on the other hand, by a shaft 3 termed the secondary shaft journalled at the upper end of the first and perpendicular to the latter. On a third shaft 4, parallel to the secondary shaft 3 is fixed a casing 5 containing the motor parts and their controlling relays; this casing comprises an orientation face 6 which, by means of the relays, is automatically maintained, set perpendicularly to the incident solar rays; to this effect this casing is connected to the mirror 1 by the pinions 7 and 8 and the toothed sector 9 in such a manner that when the casing 5 turns by a certain angle about the shaft 4, the shaft 3 and the mirror 1 rotate in the same direction as the casing, but by half the angle of the rotation of the casing only. Furthermore, the casing 5 and its connection with the mirror are disposed in such a manner that the face of orientation 6 is parallel to the mirror 1 when the latter is perpendicular to the shaft 2. Under these conditions the mirror is constantly normal to the bisector of the angle formed by the incident rays and the produced shaft 2, in such a manner that, according to the explanations given at the beginning of the description, the reflected rays are constantly parallel to the primary shaft 2.

The search of the correct position of the apparatus with respect to the sun is based on the following principle: If we consider, on one hand, a plane passing through the primary shaft 2 integral in rotation with this shaft and perpendicular to the face 6 and, on the other hand, a plane passing through the auxiliary shaft 4, integral in rotation with this shaft and perpendicular to the orientation face 6, these two planes, termed "planes of comparison" must follow the sun. As soon as the sun appears, the two shafts start to rotate under the effect of suitable starting means which will be described below; on the other hand, stopping means controlling the two rotations are disposed on the orientation face 6, in such a manner that each of these two shafts comes to a stop at the moment when the plane of comparison defined above and integral with it passes through the sun; when the two rotations have come to a stop, the sun is situated on the intersection of the two planes of comparison. As this intersection is perpendicular to the orientation face 6, the solar rays are also perpendicular to the said face. It will be seen that the operation substantially consists in a double adjustment in azimuth and site with the difference that, as the secondary shaft is not necessarily horizontal, the horizontal plane of comparison for site pointing is replaced by a plane perpendicular to the primary shaft 2.

Fig. 4 indicates diagrammatically the arrangement of the apparatus: The primary shaft 2 rotates in a socket 10 fixed, for instance by a balljoint 10', to the supporting member 11 of the heliostat (the shaft 2 is shown here in vertical direction); the shaft 2 carries, at its upper end, a fork 12 at the upper end of which is journalled the secondary shaft 3 to which is fixed the mirror 1. The shaft 4 is fixed to the base of the fork 12, it carries at its ends the casings 5, 5' keyed thereon. At its upper end the socket 10 carries a circular plate 14 provided on its periphery with a rack 15 with which meshes a pinion 16 formed with a socket, mounted freely on the shaft 4. Each of the casings 5, 5' contains a motor 17, 17', the motor 17, controlling the rotation of the apparatus about the primary axis, drives a pinion 18 keyed on the socket of the pinion 16, whilst the motor 17', controlling the movement of the mirror about the secondary axis, drives a pinion 19 meshing with a pinion 20 which is fixed due to the fact that its hub is fixed to the fork 12. Elements sensitive to the solar light or heat are disposed at 21 and 21' in the terminal planes perpendicular to the shaft 4 of the casings 5, 5'; they are adapted to produce the starting of the primary motor 17 because, as soon as the sun appears, it illuminates one of the two sensitive elements 21, 21', whatever the position of the apparatus with respect to the sun may be at this particular instant. The casing 5' further carries the orientation face 6 already mentioned above, and which is parallel to the shaft 4.

The apparatus operates in the following manner: As soon as one of the elements 21 or 21' is illuminated, the primary motor 17 starts to move; this motor drives the pinion 16 which, by rolling over the fixed rack 15, causes the primary shaft 2 to rotate with the whole apparatus which it carries. This primary rotation is automatically stopped by means of parts which will be described below, as soon as the secondary shaft 4 becomes perpendicular to the plane defined by the sun and the primary shaft, i. e. as soon as the sun tends to traverse a plane passing through the primary shaft 2 and perpendicular to the shaft 4, therefore also to the orientation face 6. The secondary motor 17' has also been started during this time, by means of relays which will be described further; it causes the casings 5 and 5' to rotate, together with the shaft 4 which is integral with it, by means of the pinion 19 rolling over the fixed pinion 20. This secondary movement automatically stops as soon as the orientation face 6 has rotated about the auxiliary shaft 4 by an angle sufficient to bring the sun in a plane perpendicular to the face 6 and parallel to the shaft 4 (the sun having been brought, as said above, in a plane passing through the primary shaft 2 and perpendicular to the face 6). The solar rays are then parallel to the intersection of these two planes of comparison and are thus perpendicular to the face 6.

The motors 17, 17' controlling the movements of the heliostat may, of course, be of any desired type, electrical or mechanical (for instance spring motors), and the various elements sensitive to the solar rays may also be of any nature and disposed in order to effect the control of the motors in a number of different manners, by controlling electric contacts, clutches or the like, without departing from the frame of the invention.

In the simple form of realization, however, which will be described below, it has been thought preferable to use, as relays sensitive to the solar rays, thermo-elements consisting in a combination of two different metals, and, as motor means, clockwork motors, or more precisely spring motors without escapement, the said thermo-elements ensuring the control of the motors either in letting them run or in braking until to a stop some small wheels driven at high speed by these motors by means of suitable multiplying parts.

Before describing in detail the arrangement of the various parts corresponding to the primary and secondary movements of the apparatus, we will first rapidly describe, in order to facilitate the further detailed description, some of the arrangements used for the thermo-relay elements.

Fig. 5 is a plan view of a thermo-element used in the apparatus; this thermo-element 22 is constituted by two superposed metal strips whose coefficients of expansion are different, each strip being cut out in the form of a flat U and the strips being soldered to one another. If one of the two branches 24 or 24' of the thermo-element is heated, the heated branch bends thus producing a relative displacement perpendicular to the plane of the element between the ends of the two branches, the direction of which displacement reversing, if the base 22 of the element is fixed in a plane, according to whether one or the other branch of the element is being heated; it will therefore be easily understood that the displacement due to the heating of one or the other of the two branches may be utilized for breaking a rotating part.

Figure 6:
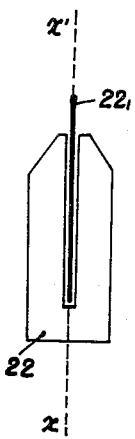

The part referred to above as the orientation face 6 is constituted by two of these thermo-elements 22, 22' (Fig. 6) disposed one next to the other in two orthogonal planes, their normal planes of symmetry $xx'$ and $yy'$ being coincident with the two planes of comparison defined above. Furthermore, between the branches of the thermo-elements and normally to their plane are placed opaque screens $22_1$ and $22_1'$ whose planes thus coincide with the said planes of comparison. The effect of these screens is that, for a given position of the sun, one branch only of each of the two elements is illuminated, and that the passage of the sun in the plane of one or of the other screen produces the cooling down of the branch which was at first illuminated and the heating of the other branch.

The change of direction of the relative displacement which then takes place between the ends of the two branches of each element, due to the change in the position of the sun with respect to the plane of the corresponding screen, is utilized for stopping the corresponding movement. The element 22 will serve for instance for stopping the primary rotation (azimuthal setting), whilst the element 22' will serve for stopping the secondary rotation (site setting).

The initial starting means of both the primary and the secondary movements at the moment of the appearance of the sun (indicated in Fig. 4 by 21, 21') will also be constituted by thermo-elements, the movement being set up in one or the other direction according to whether the sun is situated on one side or another of the opaque screen integral with each thermo-element.

Figure 7:
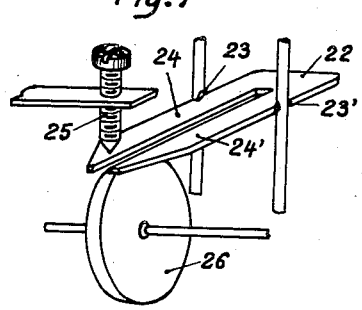

Fig. 7 shows a very simple arrangement for fixing a thermo-element, in which the element 22, in form of a flat U, is maintained with a small amount of play in two symmetrical points 23, 23' on the external edges of its branches 24, 24', in such a manner that it may pivot about these points. In order to eliminate the effect of gravity, the element is balanced with respect to the axis of rotation 23, 23'. One of the branches, 24, further abuts with its end against an adjusting screw 25 fixed to a supporting part of the apparatus whilst the other branch 24' is in contact with a small wheel 26 preferably in rubber, and driven at a high speed by one of the motors of the apparatus. For the sake of clearness, the opaque screen has not been shown. The strip with the higher coefficient of expansion is situated for instance at the top side of the element; under these conditions if the branch 24 be illuminated it warms up, bends downwards (Fig. 8) and forces the branch 24' to clear the small wheel 26. The latter is thus freed and starts to rotate under the action of its motor. In the case where the branch 24' does not brake, at rest, the wheel 26, the illumination of this branch 24' will, on the contrary, bring it in contact with this wheel and the resulting braking effect will stop the motor.

Figure 9:
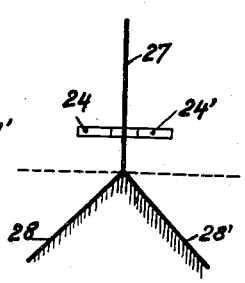

In order to reinforce the illumination of the one of the branches 24, 24' of the element receiving the solar rays, one places between these two branches (Fig. 9), instead of a simple opaque screen, as indicated above, a mirror 27 reflecting by both its faces and perpendicular to the plane of the thermo-element; this mirror, illuminated on one or the other face, casts a shadow on one of the two branches of the element and reinforces the illumination of the other. This illumination may further be reinforced by disposing, under the thermo-element 24, 24', two other mirrors 28, 28' reflecting on one of their faces only, i. e. the face turned towards 27 and inclined for instance by 135° with respect to 27. The arrangement of these three mirrors further enables one of the two branches only of the thermo-element to be illuminated, whatever the direction of the solar rays may be, provided that the latter arrive in the upper obtuse angle formed by the mirrors 28, 28'. The motor may thus be held at rest when the sun lies in the angle 27—28 and be started as soon as the sun penetrates into the angle 27—28', or conversely. This device will be particularly used as a starting relay.

Figure 10:
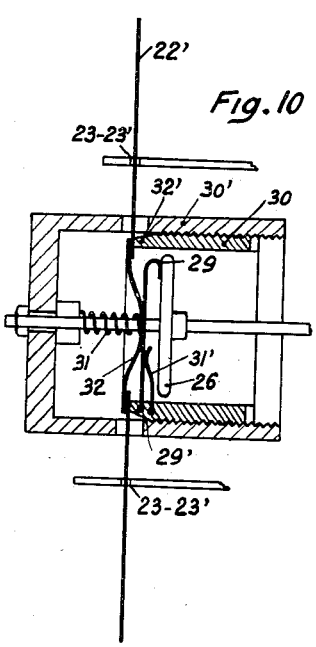
Figure 11:
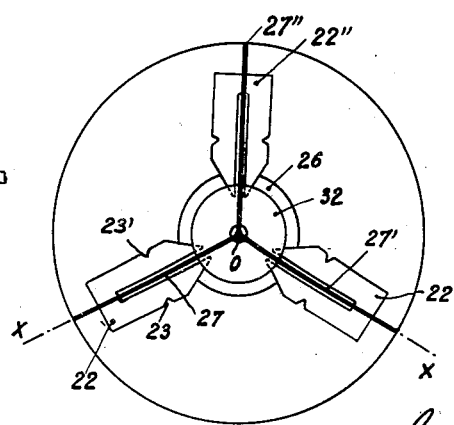

Another arrangement for the control by a thermo-element, which is also applied in the apparatus described below, is shown in Figs. 10 and 11; in this device the wheel 26 driven by one of the motors of the apparatus, is normally held against rotation by a part 29 acting as a brake and pivoted in 29' to a part 30 in the form of a nut screwed into the cylindrical supporting member 30'. This part 29 is maintained applied against the wheel 26 by a spring 31 acting through the intermission of a cup member 32; another spring 31' which is much weaker, holds the part 29 against the part 32. Three thermo-elements 22, 22', 22'' (Fig. 11) disposed at 120° from one another and maintained each in two points 23, 23', as indicated in Fig. 7, are introduced between the wheel 26 and the cup member 32 through windows formed in the supporting member 30' and the ends of both their branches are clamped between the rim of the cup member 32 and the rim 32' of the nut 30. The assembly consisting in the three thermo-elements, the cup member and the part 29 is in equilibrium on the pivoting points 23, 23' of the thermo-elements. The illumination of one branch only of one of the elements suffices for displacing the cup member 32 towards the left and for freeing the wheel 26. In order to avoid both branches of one same element 22, 22', 22'' being illuminated simultaneously, mirrors 27, 27', 27'' (Fig. 11) are disposed, as before, between the branches of the thermo-elements; furthermore, in order to avoid both branches of the three thermo-elements being equally illuminated at the same time when the incident rays are perpendicular to their common plane, said mirrors 27, 27', 27'' are disposed in such a manner that the edges of the three solid angles, formed by the planes of the mirrors taken two by two, shall not be parallel, i. e. that the three mirrors shall not be exactly perpendicular to the plane of the three thermo-elements and shall not intersect along the perpendicular to this plane passing through the point O.

Figure 12:
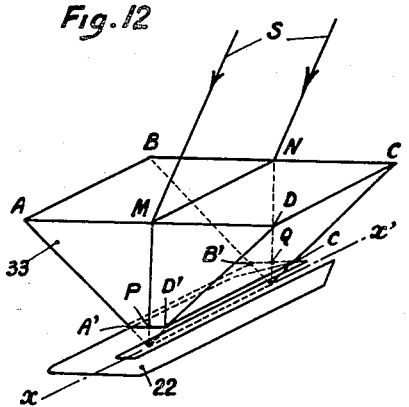

Finally another device constituted by thermo-elements of the type described, giving a plane of comparison with a very great precision and used for controlling the stopping of the heliostat motors, is shown in Fig. 12. Above the thermo-element 22 is disposed a truncated prism 33 whose longitudinal principal section MNPQ is perpendicular to the plane of the thermo-element and whose apex line would coincide with the axis of symmetry $xx'$ of the latter. The angle of the prism is chosen in such a manner that a beam of light S, for instance red light, parallel to the principal section MNPQ (perpendicular or inclined to the upper face ABCD), i. e. corresponding to the case where the sun lies in the plane of the principal section of the prism 33, falls, after refraction, on the face ABA'B' or DCD'C' under the limiting angle of total reflection. Furthermore, the lower face A'B'C'D' of the prism is blackened and does not let any light pass. Under these conditions, the two branches of the thermo-element 22 are equally well illuminated by the extreme red and infra-red rays. It is known that the index of glass is lower for the red side of the spectrum than for the violet side. As soon as the sun departs from the plane of the principal section of the prism 33, it will be seen that one of the faces ABA'B' or DCD'C' of the prism intercepts the whole of the (visible and infra-red) light by total reflection, so that the corresponding branch of the thermo-element is kept in the shadow whilst the second face of the prism allows the light to pass onto the second branch of the element, which is thus strongly illuminated in total light. A thermo-element provided with such a prism may therefore be disposed, as indicated above, for braking or freeing the wheel which it controls, according to whether the sun lies on one side or on the other of the principal section of the prism.

The operation of the thermo-relays having been described, we will now expose in detail the arrangement of the controlling mechanisms, separately for the primary and secondary rotations.

In Fig. 13 which is a longitudinal section of the device along the vertical plane passing through the shaft 4 of the casings, only the parts controlling the primary rotation have been represented.

The primary rotation device described below comprises one direction of rotation only, i. e. it corresponds to the case of Fig. 1. One may, of course, without departing from the frame of the invention, provide the primary rotation device with an automatic motion reversing device, similar for instance to that which will be described below in connection with the secondary rotation device.

Each of the casings 5, 5' is constituted by a metal part 34 enclosing the motor parts and whose end turned towards the outside is closed by a glass bell 35 enclosing the thermo-elements for starting and for stopping the motor organs.

The starting of the primary rotation is obtained in the following manner:

The primary motor 17 controls on one hand, as already indicated, the pinion 16 freely mounted on the shaft 4 and meshing with the rack 15, integral with the sleeve 10. The motor 17 drives on the other hand the satellite-carrying drum 36 of a differential 37. One of the shafts 38 of the differential 37 drives, through a train of multiplying gears 39, a small wheel 40 controlled by an assembly of three thermo-elements disposed in the terminal plane 21 in the manner indicated in Figs. 10 and 11. The second shaft 41 of the differential 37 is coupled, by means of suitable parts 41', to a shaft 13 passing through the shaft 4 which is pierced to this effect by a longitudinal channel. This shaft 41 thus penetrates into the casing 5' where it drives, through a train of gears 39', a small wheel 40' controlled by a device of three thermo-elements disposed in the plane 21' in the manner already indicated. In the absence of the sun, the two small wheels 40, 40' are prevented from turning. The two planetary wheels of the differential 37 are kept at rest so that the motor 17 meshing with the drum 36, rendered immovable by the planetary wheels, cannot turn. On the contrary, as soon as the sun appears, it necessarily illuminates a thermo-element of one of the two assemblies of thermo-elements placed in 21 or 21', whatever the orientation of the two shafts of the apparatus may be at this instant. One of the wheels 40 or 40' is thus set free and as the corresponding planetary wheel of the differential 37 may turn freely, the motor 17 can turn and drive the pinion 16, thus causing the mirror to rotate about the primary axis 2 as indicated above. As has been indicated at the beginning of the description, the primary movement must stop when the secondary shaft 3 i. e. also the shaft 4) gets to be perpendicular to the plane passing through the primary shaft 2 and through the sun. This stopping is obtained by means of the following parts: The drum 36 of the differential 37 drives, through a train of multiplying gears 39'', a small wheel 42 controlled by a thermo-element 43 acted upon by the solar rays, according to Fig. 12, through the prism 44 whose principal section is perpendicular to the shaft 4, the thermo-element being disposed in a manner to keep the wheel 42 from turning, as indicated above (Figs. 12, 7 and 8) when the sun passes through the plane containing the principal section of the prism 44.

When the primary rotation has brought the prism 44 in a suitable position, the thermo-element 43 brakes the wheel 42 and also stops the motor by means of the shaft 13 and of the drum 36 of the differential 37.

On the axis of the wheel 42 are fixed vanes 80 forming an air brake and serving to prevent the racing of the mechanism.

As indicated at the beginning of the description, the direction of the primary rotation is not the same according to whether the solar rays are reflected towards the northern or the southern celestial hemisphere; the invention therefore provides a train of gear wheels, which has not been shown on the drawings, for reversing the primary rotation.

The parts controlling the secondary rotation, i. e. the rotation of the casings 5, 5' about themselves, are somewhat more complicated because this rotation must necessarily be effected, in all cases, in one or the other direction according to the direction of displacement of the sun.

The secondary motor 17' (Fig. 14) drives the pinion 19 through a reversing device shown on Fig. 15; this device comprises two differentials, one of which, 45, is driven by the motor through the shaft 46. On this shaft 46 is keyed a pinion 47 directly meshing with an identical pinion 47' keyed on the shaft 46' of the second differential 45'. On the contrary, the pinions 49, 49' keyed on the outgoing shafts 48, 48' are united by an intermediate pinion 50. The movement to be controlled being taken from the shaft 48, it will be easily seen that this movement takes place in the direction opposite to that of the shaft 46, or in the same direction than the latter according to whether one or the other of the satellite-carrying drums of the differentials 45 or 45' are prevented to turn. If both the drums are simultaneously prevented to turn, the motor is also kept from turning. In fact, instead of braking directly these satellite-carrying drums, the braking is done, as in the case of the primary movement, on small wheels driven by these drums through a train of multiplying gears.

Figure 8:
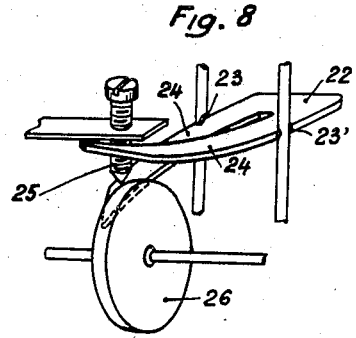

Fig. 14 shows diagrammatically the parts driving and controlling the secondary movement. The motor 17' drives, by means of the gear wheel 51, the two differentials 45 and 45' shown one above the other for the sake of clearness (in fact, the two differentials are placed on either side of the motor 17' in order to take less place in the casing). The secondary shaft 48 of the differential 45 transmits its movement of rotation, through the pinions 49—52, to a shaft 53 on which is keyed the small pinion 19 meshing with the pinion 20 whose hub is fixed on the fork 12 carrying the mirror 1. The satellite-carrying drum of the differential 45 drives, through a train of multiplying pinions, a starting wheel 54 and a stopping wheel 55. The drum of 45' drives, likewise, through a similar, not represented, transmission, the starting and stopping wheels 54' and 55'. As in the case of the primary mechanism, vanes 80 are fixed to the shafts of the wheels 54 and 54' and constitute an air-brake. The starting wheels 54, 54' are controlled by thermo-elements 56, 56' mounted as indicated in Figs. 7 and 8, and provided with mirrors according to Fig. 9. The mirrors of these two starting thermo-elements are disposed in such a manner that only one of the elements may be actuated by the incident solar rays for a given position of the sun, except in the case where, as will be explained below, the apparatus is correctly set with respect to the sun. The stopping wheels 55, 55' are controlled by the thermo-elements 57, 57' provided, according to Figure 12, with prisms 58, 58' disposed in such a manner that the planes of their principal sections contain the axis of the secondary shaft 4. These principal sections are therefore at right angles with that of the stopping prism 44 for the primary movement (Fig. 13).

The stopping thermo-elements 57, 57' are mounted in opposition, i. e. that one of them brakes the wheel which it controls whilst the other one lets its wheel free, and conversely; this is obtained simply for instance by maintaining by means of screws such as 25 (Fig. 7) the non corresponding branches of the two thermo-elements.

The operation of this part of the device is the following: in the absence of the sun, the thermo-elements 56, 56' brake the starting wheels 54, 54' and prevent the two differentials from turning thus holding the motor 17' at rest. As soon as the sun appears, one of the thermo-elements 56 or 56' has one of its branches illuminated thus freeing the corresponding wheel 54 or 54' and the corresponding one of the two satellite-carrying drums of the differentials 45, 45', and bringing about the starting of the secondary rotation. If it is assumed for instance that the wheel 54' has thus been freed, the drum 45 is alone kept from rotation and the casings 5, 5' will turn with the shaft 4 in the same direction as the motor 17 (during this time, the stopping wheel 55' is free whilst the stopping wheel 55 is kept from rotating). When the casings 5, 5' have turned by such an angle that the sun tends to pass beyond the plane of the principal section of the prism 58', the thermo-element 57' brakes the wheel 55', stops again the differential 45' and with it the motor 17'. At this instant, the incident light is perpendicular to the face of the prism 58' as it is parallel, on one hand, to the principal section of the latter, and, on the other hand (owing to the accomplishment of the primary movement) to the principal section of the prism 44 (Fig. 13), perpendicular to the former. The base of the prism 58' therefore plays the part of the orientation face 6 indicated at the beginning of the present description.

The wheels 54, 56 have exactly the same function when the rotation takes place in the opposite direction; the principal sections of the prisms 58 and 58' would consequently have to be contained in the same plane. In fact these principal sections are set at a slight angle on one side and the other of their common correct position and form between them a small angle—of one degree for instance,—in order to produce the stopping of the apparatus with a slight advance so that the second thermo-element shall still be in the braking position at the moment of the stopping, and this, to avoid the secondary rotation to be reversed due to the fact that the second starting thermo-element would also be actuated at the moment where the apparatus lies in the correct position with respect to the sun. The apparatus thus comes to rest inside the small angle formed by the principal planes of the prisms 58, 58'.

As has been indicated at the beginning of the present description, the motors 17, 17' controlling the two rotations of the heliostat are clock-work motors without escapement. The invention also provides an electric device for automatically rewinding the springs of the motors. To this effect, the barrel 17 (Fig. 16) of each of the motors comprises an electric contact 59 closing, when the spring is unwound, for instance at the end of a turn performed by the motor, the circuit of an electromagnet 60 also disposed in the casing containing the motor and fed from any convenient source through the switch 61. The armature 62 of the electromagnet 60 is integral with a lever 63 pivoted in 64 and carrying at its other end a pawl 65 which engages, each time the armature is attracted, a ratchet wheel 66 keyed on the shaft of the barrel. The switch is provided in such a manner that during the closing of the circuit of the electromagnet 60 it sends out as many current impulses to the electromagnet as are necessary for the spring of the motor to be completely wound up. The utilized switch may obviously be of any desired type but it is preferable, in order to avoid the sparks, to employ the one represented on the drawings. This switch which is already known per se is constituted by a bent tube containing at its lower part a certain amount of mercury which makes a contact between the terminals 67, 68. At one end of the tube is formed a bulb 69 filled with hydrogen gas and containing a filament 70 heated by the passage of the current as soon as the contact 59 is closed. The expansion of the hydrogen due to the heating drives the mercury past the terminal 67. The current is thus interrupted, the hydrogen cools down, the mercury recloses the circuit and so on.

The practical realization of the switch controlled by the barrel is shown on Fig. 17. To this effect, the barrel 17 of the motor carries a socket 71 integral in rotation only with a nut 72 movable along the rewinding shaft 73 which is screw-threaded. This nut carries, at its end, a circular groove 74 engaging with the head 75 of a bent lever 76 pivoted in 77 and whose other end is placed opposite a stud 78. When the barrel has turned through a certain angle with respect to the rewinding shaft 73, the longitudinal displacement of the nut 72 brings the lever 76 into contact with the stud 78 and rewinding takes place until the nut 72 has moved a sufficient distance in the opposite direction for breaking the contact 77—78.

The adjunction of this electric rewinding device makes the apparatus object of the invention entirely automatic; the apparatus follows the sun by its own means, adjusts itself after a momentary or a longer disappearance of the sun, the only necessary intervention consisting in the choice of the direction to be illuminated by the reflected rays, i. e. in the setting of the primary shaft of the heliostat.

What we claim is:—

1. In a self regulating heliostat comprising a movable mirror, a primary shaft carrying said mirror and, for varying the inclination of the mirror on said primary shaft, a secondary shaft disposed normally to the first, motors actuating said shafts, relays actuated by the incident solar rays and controlling said motors, said relays being connected in rotation to said shafts, means for rotating the mirror together with said relays about the primary shaft, and means for rotating the mirror about the secondary shaft by half the angle of rotation of the relays.

2. In a self regulating heliostat comprising a movable mirror, a primary shaft carrying said mirror and, for varying the inclination of the mirror on said primary shaft, a secondary shaft disposed normally to the first, motors actuating said shafts, relays actuated by the incident solar rays, said relays being connected in rotation to said shafts, an element of plane surface termed the orientation face and integral with these relays, means for controlling the motors by these relays in such a manner as to maintain said orientation face constantly normal to the incident solar rays, means for rendering the mirror integral in rotation with said orientation face with respect to the primary shaft, means for connecting the mirror to the said face of orientation in order to cause said mirror to rotate about the secondary shaft by half the angle of rotation of the said face of orientation.

3. In a self regulating heliostat comprising a movable mirror, a primary shaft carrying said mirror and, for varying the inclination of the mirror on said primary shaft, a secondary shaft disposed normally to the first, motors actuating said shafts, relays actuated by the incident solar rays, said relays being connected in rotation to said shafts, an element of plane surface termed the orientation face and integral with these relays, means for controlling the motors by these relays in such a manner as to maintain said orientation face constantly normal to the incident solar rays, means for rendering the mirror integral in rotation with said orientation face with respect to the primary shaft, means for connecting the mirror to said face of orientation in order to cause said mirror to rotate about the secondary shaft by half the angle of rotation of the said face of orientation, said means for connecting the mirror being established in such a manner that the mirror and the face of orientation are parallel when this latter face is normal to the primary shaft.

4. In a self regulating heliostat comprising a movable mirror, a primary shaft carrying said mirror and, for varying the inclination of the mirror on said primary shaft, a secondary shaft disposed normally to the first, motors actuating said shafts, relays actuated by the incident solar rays, said relays being connected in rotation to said shafts, an element of plane surface termed the orientation face and integral with these relays, means for controlling the motors by these relays in such a manner as to maintain said orientation face constantly normal to the incident solar rays, means for rendering the mirror integral in rotation with said orientation face with respect to the primary shaft, means for connecting the mirror to said face of orientation in order to cause said mirror to rotate about the secondary shaft by half the angle of rotation of the said face of orientation, said means for connecting the mirror being established in such a manner that the mirror and the face of orientation are parallel when this latter face is normal to the primary shaft, means for setting the primary shaft in the proper direction.

5. In a self regulating heliostat comprising a movable mirror, a primary shaft carrying said mirror and, for varying the inclination of the mirror on said primary shaft, a secondary shaft disposed normally to the first, motors actuating said shafts, relays connected in rotation to said shafts constituted by two metal thermo-elements with two arms in form of a flat U and provided with means for illuminating one arm only of each element at any instant, means for controlling the motors by the displacements of the arms of said elements, means for rotating the mirror together with said relays about the primary shaft, and means for rotating the mirror about the secondary shaft by half the angle of rotation of the relays.

6. In a self regulating heliostat comprising a movable mirror, a primary shaft carrying said mirror and, for varying the inclination of the mirror on said primary shaft, a secondary shaft disposed normally to the first, motors actuating said shafts, relays connected in rotation to said shafts constituted by two metal thermo-elements with two arms in form of a flat U and provided with means for illuminating one arm only of each element at any instant, means for controlling the motors by the displacements of the arms of said elements in such a manner that the plane of said thermo-elements be constantly normal to the incident solar rays, means for rendering the mirror integral in rotation with said thermo-elements with respect to the primary shaft, means for connecting the mirror to said thermo-elements in such a manner that said mirror is made to rotate by half the angle of rotation of the plane of said thermo-elements, the mirror and the plane of the thermo-elements being parallel when said plane is normal to the primary shaft.

7. In a self regulating heliostat comprising a movable mirror, a primary shaft carrying said mirror and, for varying the inclination of the mirror on said primary shaft, a secondary shaft disposed normally to the first, motors actuating said shafts, relays connected in rotation to said shafts and actuated by the incident solar rays, said relays comprising, on one hand, relays for starting the primary and secondary movements and, on the other hand, relays for stopping these two movements, said stopping relays being constituted by thermo-elements in form of a flat U and provided with means for illuminating one arm only of each element at any instant, means for controlling the motors by the displacements of the arms of said elements in such a manner that the plane of said stopping elements be constantly normal to the incident solar rays, means for rendering the mirror integral in rotation with said thermo-elements with respect to the primary shaft, means for connecting the mirror to said thermo-elements in such a manner that the said mirror is made to rotate by half the angle of rotation of the plane of said thermo-elements, the mirror and the plane of the thermo-elements being parallel when said plane is normal to the primary shaft.

8. In a self regulating heliostat comprising a movable mirror, a primary shaft carrying said mirror and, for varying the inclination of the mirror on said primary shaft, a secondary shaft disposed normally to the first, motors actuating said shafts, relays connected in rotation to said shafts constituted by two metal thermo-elements with two arms in form of a flat U, a mirror disposed between the two branches of the thermo-elements, normally to the plane of the latter, two further mirrors disposed under the thermo-element, fixed to the lower edge of the first mirror and inclined by about 135° with respect to the latter, means for controlling the motors by the displacements of the arms of said elements, means for rotating the mirror together with said relays about the primary shaft, and means for rotating the mirror about the secondary shaft by half the angle of rotation of the relays.

9. In a self regulating heliostat comprising a movable mirror, a primary shaft carrying said mirror and, for varying the inclination of the mirror on said primary shaft, a secondary shaft disposed normally to the first, motors actuating said shafts, relays connected in rotation to said shafts constituted by two metal thermo-elements with two arms, in form of a flat U, a truncated prism disposed above the thermo-element on the path of the incident rays in such a manner that the principal section be normal to the plane of the thermo-element and that the intersection of the produced lateral faces coincides with the axis of symmetry of the thermo-element, the angle of this prism being such that a ray of light parallel to the plane of the principal section of the prism falls under the limiting angle of total reflection on the lateral face of the prism, the small base of the prism being blackened, means for controlling the motors by the displacements of the arms of said elements, means for rotating the mirror together with said relays about the primary shaft, and means for rotating the mirror about the secondary shaft by half the angle of rotation of the relays.

10. In a self regulating heliostat comprising a movable mirror, a primary shaft carrying said mirror and, for varying the inclination of the mirror on said primary shaft, a secondary shaft disposed normally to the first, motors actuating said shafts, relays connected in rotation to said shafts constituted by two metal thermo-elements with two arms, in form of a flat U and provided with means for illuminating one arm only of each element at any instant, a supporting member, means for pivoting with a certain amount of play each thermo-element on said supporting member in two symmetrical points situated on the external edges of its branches, on said supporting member a stop disposed in a manner to check the motion of the end of one of the branches of the thermo-element, means for controlling a motor by the displacements of the end of the other branch, means for rotating the mirror together with said relays about the primary shaft, and means for rotating the mirror about the secondary shaft by half the angle of rotation of the relays.

11. In a self regulating heliostat comprising a movable mirror, a primary shaft carrying said mirror and, for varying the inclination of the mirror on said primary shaft, a secondary shaft disposed normally to the first, motors actuating said shafts, relays connected in rotation to said shafts constituted by two metal thermo-elements with two arms, in form of a flat U and provided with means for illuminating one arm only of each element at any instant, a supporting member, means for pivoting with a certain amount of play each thermo-element on said supporting member in two symmetrical points situated on the external edges of its branches, on said supporting member a stop, a movable part, a spring acting upon this movable part in a manner to grip the ends of the two branches of the thermo-element between said stop and said movable part, means for controlling a motor by the displacements of said movable part, means for rotating the mirror together with said relays about the primary shaft, and means for rotating the mirror about the secondary shaft by half the angle of rotation of the relays.

12. In a self regulating heliostat comprising a movable mirror, a primary shaft carrying said mirror and, for varying the inclination of the mirror on said primary shaft, a secondary shaft disposed normally to the first, spring motors actuating said shafts, relays connected in rotation to said shafts constituted by two metal thermo-elements with two arms, in form of a flat U and provided with means for illuminating one arm only of each element at any instant, small wheels, multiplicating parts with great multiplying ratio disposed between the spring motors and said small wheels, means for braking the freeing said small wheels by the displacements of the ends of the arms of the thermo-elements, means for rotating the mirror together with said relays about the primary shaft, and means for rotating the mirror about the secondary shaft by half the angle of rotation of the relays.

13. In a self regulating heliostat comprising a movable mirror, a primary shaft carrying said mirror and, for varying the inclination of the mirror on said primary shaft, a secondary shaft disposed normally to the first, a motor actuating the primary shaft, a motor actuating the secondary shaft, relays connected in rotation to said shafts and actuated by the incident solar rays, said relays comprising two relays for starting the primary movement disposed on either side of the secondary shaft and constituted each by thermo-elements in form of a flat U disposed in planes normal to said secondary shaft, means for starting the primary motor as soon as one of these relays is illuminated by the sun, relays for starting the secondary movement, relays for stopping the primary and the secondary movements, said stopping relays being constituted by thermo-elements in form of a flat U disposed in a plane parallel to the secondary shaft, means for controlling the primary and secondary motors by the displacements of the arms of these thermo-elements in such a manner that the plane of said elements be constantly normal to the incident solar rays, means for rendering the mirror integral in rotation with said thermo-elements with respect to the primary shaft, means for connecting the mirror to said thermo-elements in such a manner that said mirror is made to rotate by half the angle of rotation of the plane of said thermo-elements, the mirror and the plane of the thermo-elements being parallel when said plane is normal to the primary shaft.

14. Self regulating heliostat comprising a stand, a socket fixed to said stand, means for setting this socket in direction, a shaft termed primary shaft rotatably mounted in said socket, at the free end of said primary shaft a fork, a secondary shaft normal to the primary shaft and maintained in a rotatable manner in the ends of the two arms of said fork, a mirror fixed on said secondary shaft, a third shaft parallel to the secondary shaft and mounted in a rotatable manner on the base of the fork, two casings disposed at the ends of this shaft on either side of the fork, inside these casings motors and relays actuated by the incident solar rays, means for ensuring the rotation, from these motors, of the primary shaft and the shaft carrying the casings, means for controlling the motors by the relays in a manner to maintain these relays in a suitable position with respect to the sun, means for driving the secondary shaft carrying the mirror by the shaft carrying the casings, these means comprising a train of reducing gears, the ratio of which is equal to 2.

15. Self regulating heliostat comprising a stand, a socket fixed to said stand, means for setting this socket in direction, a circular rack fixed to the upper end of this socket, a shaft termed primary shaft rotatably mounted in said socket, at the free end of said primary shaft a fork, a secondary shaft normal to the primary shaft and maintained in a rotatable manner in the ends of the two arms of said fork, a mirror fixed on said secondary shaft, a third hollow shaft parallel to the secondary shaft and mounted in a rotatable manner on the base of the fork, two casings disposed at the ends of this shaft on either side of the fork, in one of these casings a spring motor termed primary motor, a socket mounted freely on the hollow shaft carrying the casing, means for controlling this socket by the primary motor, a pinion keyed on this socket and gearing with the circular rack, a differential comprising two satellites, two planetary wheels and a drum carrying the satellites, means for actuating this drum by said primary motor, a shaft integral with one of the planetary wheels of the differential, a train of multiplying gears controlled by this shaft, a small wheel turning at high speed and controlled by this multiplying train, a starting relay sensitive to the solar light and disposed in a manner to brake normally the said small wheel and to free the same as soon as it is illuminated by the sun, a second shaft integral with the second differential planetary wheel and disposed in the inside of the hollow shaft carrying the casings, at the end of this second shaft a multiplying train housed in the second casing and a small wheel controlled by this train, a starting relay sensitive to the solar light and disposed in the same manner as the first, in the first casing, a shaft controlled by the satellite carrying drum of the differential, a small wheel fixed on this shaft, a stopping relay constituted by a thermo-element in form of a flat U disposed in a manner that its axis of symmetry is normal to the hollow shaft carrying the casings and that its plan is parallel to this shaft, means for enabling one or the other of the arms of the thermo-element to be illuminated by the sun according to whether the sun is situated on one side or the other of the plane of symmetry of the thermo-element, means for checking movement of one of the arms, means for braking the small wheel by the displacements of the other arm as soon as the latter is illuminated by the sun, inside the second casing another motor termed secondary motor, means for controlling by this motor the hollow shaft carrying the casings of the starting and the stopping relays for this secondary motor, means for driving the secondary shaft carrying the mirror by the shaft carrying the casings, these means comprising a train of reducing gears, the ratio of which is equal to 2.

16. Self regulating heliostat comprising a stand, a socket fixed to said stand, means for setting this socket in direction, a shaft termed primary shaft rotatably mounted in said socket, at the free end of said primary shaft a fork, a secondary shaft normal to the primary shaft and maintained in a rotatable manner in the ends of the two arms of said fork, a mirror fixed on said secondary shaft, a third shaft parallel to the secondary shaft and mounted in a rotatable manner on the base of the fork, two casings disposed at the ends of this shaft on either side of the fork, in one of these casings a spring motor, means for controlling by this motor the rotation of the primary shaft, inside each one of the casings a small wheel and means for driving these small wheels at high speed by the primary motor, in the neighborhood of each of these wheels a relay constituted by three thermo-elements in form of a flat U disposed at 120° from one another in one same plane normal to the shaft carrying the casings, a supporting member, means for pivoting each of these thermo-elements to this supporting member, a part in form of a cup, a spring acting upon this cup in a manner to grip the ends of the arms of the three thermo-elements between this cup and the supporting member, means for braking the small wheel by this cup when the thermo-elements are not illuminated, and means for freeing said small wheel by the displacement of this cup when one of the thermo-elements is illuminated by the sun, inside the same casing as the primary motor another small wheel, means for driving this wheel at high speed by the primary motor, in the neighborhood of this wheel a relay constituted by a thermo-element disposed in a plane parallel to the shaft carrying the casings in a manner that the axis of symmetry of this thermo-element is normal to this shaft, a supporting member, means for pivoting the thermo-element with a certain amount of play on this supporting member in two symmetrical points situated on the external edge of its arms, a stop on this supporting member disposed in a manner to check movement of one of the arms of the thermo-element, means for braking the small wheel by the other arm of the element when this arm is illuminated by the sun, above the thermo-element, a truncated prism disposed on the path of the rays of light in a manner that its principal section is normal to the plane of the thermo-element and that the intersection of its lateral faces coincides with the axis of symmetry of the thermo-element, the angle of this prism being such that a ray parallel to the plane of its principal section falls under the limiting angle of total reflection on the lateral faces of the prism, the small base of the prism being blackened, inside the second casing another motor termed secondary motor, means for controlling by this motor the hollow shaft carrying the casings of the starting and the stopping relays for this secondary motor, means for driving the secondary shaft carrying the mirror by the shaft carrying the casings, these means comprising a train of reducing gears, the ratio of which is equal to 2.

17. Self regulating heliostat comprising a stand, a socket fixed to said stand, means for setting this socket in direction, a shaft termed primary shaft rotatably mounted in said socket, at the free end of said primary shaft a fork, a secondary shaft normal to the primary shaft and maintained in a rotatable manner in the ends of the two arms of said fork, a mirror fixed on said secondary shaft, a third shaft parallel to the secondary shaft and mounted in a rotatable manner on the base of the fork, two casings disposed at the ends of this shaft on either side of the fork, inside one of these casings a motor termed primary motor, means for actuating the primary shaft by this motor, relays controlling this motor in a manner to start it as soon as the sun appears and to stop it as soon as the sun is in a plane parallel to the primary shaft and normal to the secondary shaft, inside the second casing, another spring motor, termed secondary motor, a differential, means for controlling the ingoing shaft of this differential by the said motor, a small pinion controlled by the outgoing shaft of the differential, a socket mounted freely on the shaft carrying the casings and fixed to the fork of the primary shaft, a pinion keyed on this socket and gearing with the small pinion controlled by the outgoing shaft of the differential, a pinion integral with the casing, a toothed sector keyed on the secondary shaft carrying the mirror, this toothed sector having a diameter double of that of the pinion integral with the casing, an intermediate pinion gearing at the same time with the said toothed sector and the pinion integral with the casing, a multiplying train controlled by the ingoing shaft of the differential, two small wheels controlled by this multiplying train, in the neighborhood of one of these wheels a relay sensitive to the heat of the solar rays disposed in a manner to free this wheel as soon as the sun appears, in the neighborhood of the other wheel another relay comprising a thermo-element in form of a flat U disposed in a manner that its axis of symmetry is parallel to the shaft carrying the casings, a supporting member, means for pivoting the thermo-element with a certain amount of play on this supporting member in two symmetrical points situated on the external edge of its arms, a stop on this supporting member disposed in a manner to check movement of one of the arms of the thermo-element, means for braking the small wheel by the other arm of the element when this arm is illuminated by the sun, above the thermo-element a truncated prism disposed on the path of the rays of light in a manner that its principal section is normal to the plane of the thermo-element and that the intersection of its lateral faces coincides with the axis of symmetry of the thermo-element, the angle of this prism being such that a ray parallel to the plane of its principal section falls under the limiting angle of total reflection on the lateral faces of the prism, the small base of the prism being blackened.

18. Self regulating heliostat comprising a stand, a socket fixed to said stand, means for setting this socket in direction, a shaft termed primary shaft rotatably mounted in said socket, at the free end of said primary shaft a fork, a secondary shaft normal to the primary shaft and maintained in a rotatable manner in the ends of the two arms of said fork, a mirror fixed on said secondary shaft, a third shaft parallel to the secondary shaft and mounted in a rotatable manner on the base of the fork, two casings disposed at the ends of this shaft on either side of the fork, inside one of these casings a motor termed primary motor, means for actuating the primary shaft by this motor, relays controlling this motor in a manner to start it as soon as the sun appears and to stop it as soon as the sun is in a plane parallel to the primary shaft and normal to the secondary shaft, inside the second casing another spring motor termed secondary motor, a motion reversing device comprising two differentials, each differential having an ingoing shaft and an outgoing shaft, on each ingoing shaft a pinion, these pinions being directly geared with one another, a pinion on each outgoing shaft and an intermediate pinion disposed in a manner to be simultaneously geared with the said two pinions, means for controlling one of the ingoing shafts by the secondary motor, means for controlling the rotation of the casing by one of the outgoing shafts, a reducing device the ratio of which is equal to 2 between the casing and the secondary shaft carrying the mirror, for every ingoing shaft a starting relay and a stopping relay, the starting relays being constituted each by a thermo-element whose axis is normal to the shaft carrying the casings, a mirror between the two arms of the element and means for freeing the corresponding ingoing shaft of the motion reversing device as soon as it is illuminated, these two starting thermo-elements being disposed in a manner that one or the other is illuminated as soon as the sun appears, and the stopping relays being constituted by thermo-elements disposed in a manner that their axes are parallel to the shaft carrying the casings and in extension one after the other, and that their planes make between them a very small angle, means for enabling one or the other arm of each thermo-element to be illuminated according to whether the sun is on one side or on the other of the plane of symmetry of the thermo-element, means for checking the movement of one of the two arms of each element, means for braking the corresponding ingoing shaft of the motion reversing device by the displacement of the second arm of each thermo-element when this arm is illuminated by the sun, these two thermo-elements being disposed in a manner that one or the other operates according to whether the sun is on one side or on the other of the common plane of symmetry.

19. In a self regulating heliostat comprising a movable mirror, a primary shaft carrying said mirror and, for varying the inclination of the mirror on said primary shaft, a secondary shaft disposed normally to the first, spring motors actuating said shafts, relays actuated by the incident solar rays and controlling said spring motors, said relays being connected in rotation to said shafts, means for rotating the mirror together with said relays about the primary shaft, means for rotating the mirror about the secondary shaft by half the angle of rotation of the relays, and means for automatically winding up the springs of the motors actuating the primary and secondary shafts of the apparatus.

20. In a self regulating heliostat comprising a movable mirror, a primary shaft carrying said mirror and, for varying the inclination of the mirror on said primary shaft, a secondary shaft disposed normally to the first, barrel and spring motors actuating said shafts, relays actuated by the incident solar rays and controlling said barrel and spring motors, said relays being connected in rotation to said shafts, means for rotating the mirror together with said relays about the primary shaft, means for rotating the mirror about the secondary shaft by half the angle of rotation of the relays, a source of current, for each motor a switch connected to said source, an electromagnet, a swing-lever actuated by said electromagnet, at the end of said swing-lever a pawl, on the motor-shaft a ratchet-wheel, means for causing said ratchet-wheel to progress by one tooth when the electromagnet is energized, means for closing the circuit of the electromagnet when the spring is unwound, these means comprising a screw-thread disposed on the shaft of the motor, a nut integral in rotation only with the barrel of the motor, and engaged on said screw-thread, a lever pivoted in a fixed point, means for actuating this lever by the axial displacements of the said nut, means for controlling the closing of a contact by one end of said lever.

JACQUES MARIE ARTHUYS.
ANDRÉ BAYLE.